Jan. 9, 1968   H. EKNAYAN   3,363,196
GASEOUS LASER DEVICE
Filed Jan. 29, 1964   3 Sheets-Sheet 1

HRANT EKNAYAN
INVENTOR.

BY *J. M. St. Amand*

ATTORNEY

Jan. 9, 1968  H. EKNAYAN  3,363,196
GASEOUS LASER DEVICE
Filed Jan. 29, 1964  3 Sheets-Sheet 2

HRANT EKNAYAN
INVENTOR.

BY J. M. St. Amand

ATTORNEY

HRANT EKNAYAN
INVENTOR.

BY *J. M. St. Amand*

ATTORNEY

United States Patent Office 3,363,196
Patented Jan. 9, 1968

3,363,196
GASEOUS LASER DEVICE
Hrant Eknayan, 7528 Columbia St.,
South San Gabriel, Calif. 91777
Filed Jan. 29, 1964, Ser. No. 341,148
18 Claims. (Cl. 331—94.5)

ABSTRACT OF THE DISCLOSURE

Gaseous laser devices using relatively large diameter tubes and internal modulation for producing high Q cavity resonances and elimination of non-axial modes.

This invention herein described may be manufactured and used by or for the Government of the United States of America for governmental purposes without the payment of any royalties thereon or therefor.

The present invention relates to gaseous lasers and more particularly to a gaseous optical laser and means for modulating the output therefrom. This invention also relates to using the present laser as antenna and receiver for reflected energy from an object at great distances for ease in finding and tracking same.

Prior type gaseous lasers are low output devices using small diameter tubes excited with high frequency energy through external contacts. The outputs of such devices are erratic as far as amplitude and line width is concerned due to excessive heat generated internally by excitation, impurities and variation of outside temperature. These small-diameter long tubes are not sturdy, and vibrations seriously affect the cavity resonance, line width, frequency and amplitude of desired frequency, and they can not hold their beam steady on a target. The wall reflections inside such small tubes introduce undesired non-axial modes, making the line-width broader. Also because of the small diameter tube and mirrors, the adjustment of cavity resonating mirrors is very critical and the Q of the cavity is comparatively lower as a result of the large loss of photons of the desired frequency at the edges of the mirrors during the inter-reflection process. Further, the diffusion of helium metastables along the discharge path is slow thus diminishing the efficiency of these prior devices.

It is an object of the present invention to provide a gaseous laser having high output and narrow line width.

Another object of the invention is to provide a new laser device capable of eliminating non-axial modes and selecting desired frequencies.

Still another object of the invention is to provide a laser device using larger tube and mirrors and capable of producing high Q cavity resonances.

A further object of the invention is to provide an efficient, high output gaseous laser with internal modulation.

A still further object is to provide novel modulation means for gaseous lasers.

Other objects and many of the attendant advantages of this invention will become readily appreciated as the same becomes better understood by reference to the following detailed description when considered in connection with the accompanying drawings wherein.

Figure 1:
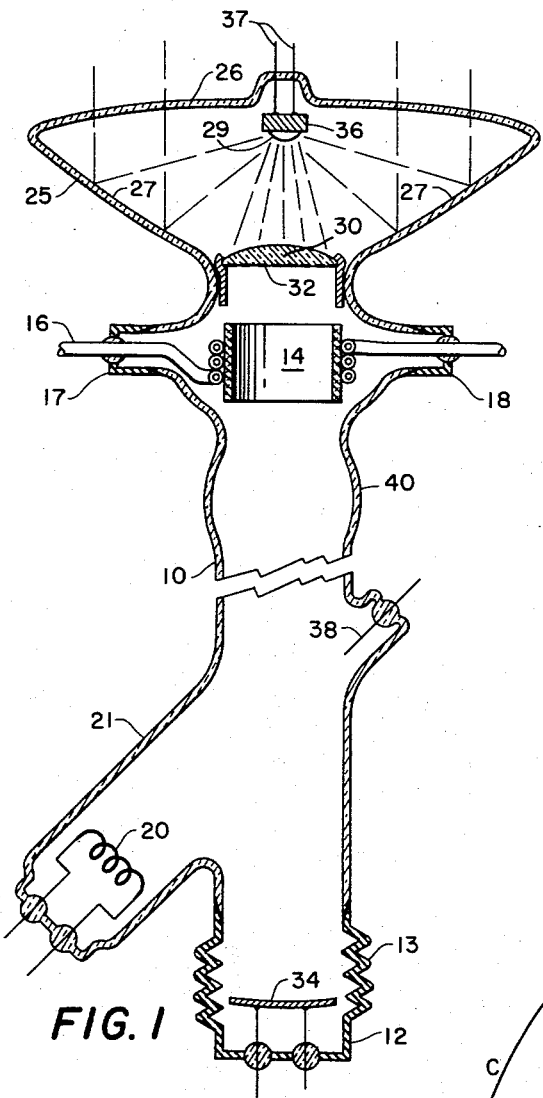
FIG. 1 is a diagrammatic cross-sectional view of one embodiment of a laser device of the present invention.

The lasers enclosure shown in FIG. 1, made of 705–2 Corning glass for example, comprises a long cylindrical tube 10 with from 12 to 25 mm. internal diameter, for example, and provided with a Kovar end cap 12, for example, having bellows 13 for minute adjustment of the cavity resonance. A cylindrical anode 14, of tantalum for example, is supported by and contact made through an anode cooling tube 16; the ends of cooling tube 16 pass to the outside of tube 10 through Kovar caps 17 and 18. The diameter of anode 14 is substantially the same as the internal diameter of tube 10 to permit passage of laser radiation therethrough. An electron emitting hot cathode 20 capable of carrying large current impulses for short durations, such as the cathode of high current thyratrons, is mounted in a portion 21 appendant to tube 10. The beam output end of the laser enclosure is enlarged at 25 and the tube end closure 26 is made of a material which will transmit the desired laser frequency. A lens-mirror combination 30 of proper material for reflecting and transmitting the desired laser frequency is used to concentrate the desired frequency light on a ceramic semisphere 29 (to 3 mm. in diameter for example) having a high coefficient of diffused reflection for the desired frequency. Lens-mirror combination may be mounted by any suitable means including means for adjusting for parallelism (e.g. from outside by magnetic means). The inside surface of enlarged enclosure portion 25 is coated with a material 27 having a high coefficient of reflection for the output frequency. The curvature of surface 27 in combination with the diffused reflection surface of semisphere 29 is such that light coming through lens 30 and striking the semisphere surface is reflected to surface 27 which in turn reflects it through transparent end 26 in a parallel beam fashion.

The inner flat surface of lens 30 is lightly coated with a high reflection factor material 32 to reflect a large percentage (e.g. 90–98%) of the radiation coming from mirror 34. Mirror 34 is slightly concave for ease in cavity resonance adjustment. The device will also operate without reflective surface 32 with lower laser output. Also, thin film dielectric coating reflectors can be used for the mirror surfaces.

A vibrating device 36, that moves semisphere 29 up and down in an axial direction to tube 10, can be used to open and concentrate the outgoing laser beam on a target at great distances, thus modulating the output energy striking the target. Device 36 can be a barium titanate crystal, for example, energized from terminals 37. This feature permits target detection in space with less angular motion of the tube and tracking with less expensive feed back systems.

High current, high efficiency anode 14 is a cylinder large enough not to overheat and interfere with the action of metastables by secondary electrons. Just below anode 14, tube 10 is shaped with a bulge 40 to allow the non-axial modes to leave the laser tube at that location without causing internal wall reflections which broaden the line width.

A thin wire 38, of platinum or molybdenum for example, is placed opposite to cathode 20 and sealed in the wall of tube 10, as shown, so as not to protrude very much beyond the inner surface of tube 10. Wire 38 is used to pass a very small discharge of 0.1 or less milliamps D.C. or intermittent currents between itself and hot cathode 20 and is used as a safety means to provide a "keep alive" grid to help the fundamental "ringing effect" of the tube firing condenser discharge.

Figure 2:
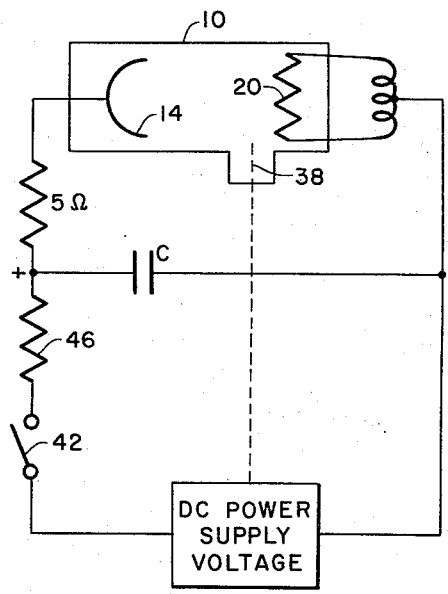
FIG. 2 is a schematic diagram of a simple electronic circuit for energizing a laser tube of the present invention such as shown in FIG. 1.

To energize the laser tube of FIG. 1, a simple electronic circuit, such as shown in FIG. 2, can be used. Tube 10 in FIG. 2 represents tube 10 as in FIG. 1, as does 14 the anode, 20 the cathode, and 38 the thin anode wire. As long as switch 42, FIG. 2 is closed, charge and discharge voltage waves across anode 14 and cathode 20, due to charging and discharging of the firing condenser C, with corresponding current bursts developed as represented by the curves shown in FIG. 3.

The gas mixture in the laser tube is 1.0 to 1.5 mm. Hg helium and 0.1 to 0.17 mm. Hg neon, for example. A getter is used in the tube to absorb foreign impurities not wanted in the discharge. The final helium and neon pressures, and the diameter and length of the tube is determined to develop a peak voltage of about 1200 volts across the tube at the instant the arc strikes. The function of resistance 46, FIG. 2, is to adjust the charging time $ce$ in FIG. 3 and the desired number of current bursts per second.

For example, in FIG. 2, if resistance 46 and the power supply voltage is adjusted to make the charge time for 1200 volts on a 30 microfaraud condenser C be .00025 second (time depends upon specific application) then in the charged condenser:

$$\text{Ergs} = 1/2 \times 30 \times 10^{-15}(1200 \times 10^8)^2 = 15 \times 14{,}400{,}000$$

$$\text{Joules} = \frac{\text{Ergs}}{10^7} = \frac{15 \times 14{,}400{,}000}{10^7} = 21.6$$

Figure 3:
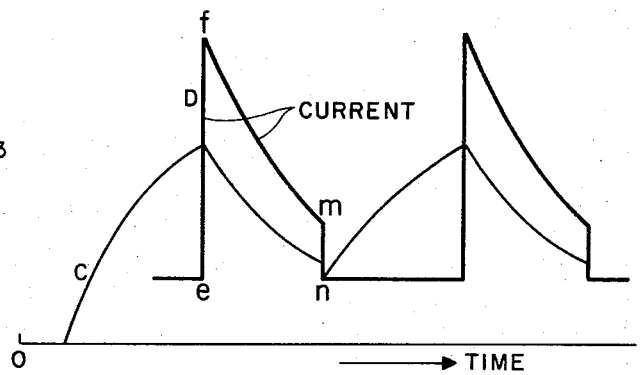
FIG. 3 shows example curves of instantaneous tube voltage and current vs. time for operation of a laser tube such as shown in FIG. 1.
Figure 4:
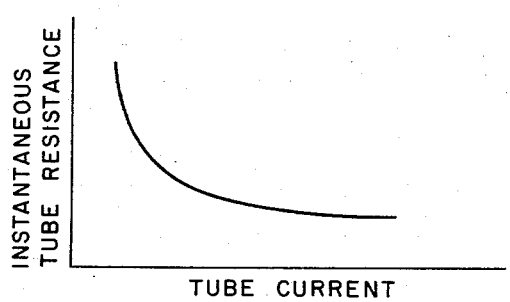
FIG. 4 is a curve of tube instantaneous resistance vs. current.

If at the instant the tube strikes (i.e. discharge starts, the current is 120 amps. and is represented by $ef$ on the curve of FIG. 3, then the tube resistance is 5 ohms at this instant since the resistance for both the tube and the 5 ohm series resistor=1200/120=10 ohms. Also, assuming that the tube goes out at 40 amps. (shown by $mn$ on the curve) since the tube cannot sustain itself at very low currents under the existing conditions, calculations must be made to determine (1) the time $t$ (between $e$ and $n$ on the curve) for the tube to cut off at 40 amps. from the 120 amp. time, and (2) the actual watts in the tube during the discharge.

$$I_{\text{cut off}} = \left[\frac{E}{R}\right] e^{\frac{-t}{rC}}$$

$$40 \text{ amps.} = \left[\frac{1200}{10}\right] e^{\frac{-10^6 t}{30r}}$$

where: R is discharge circuit resistance at 120 amp. current, $r$ is the effective overall instantaneous discharge resistance in the entire discharge circuit at 40 amp. current, $e$ is the base of the Napierian logarithm, and $t$ is the time in seconds:

$$e^{\frac{10^6 t}{30r}} = 3$$

$$\frac{10^6 t}{30r} = 1.1$$

$$r = \frac{10^6 t}{33} \text{ at 40 amps.}$$

At 40 amps. the tube resistance $= \left(\frac{10^6 t}{33} - 5\right)$ at time $t$ At 120 amps. the tube resistance $= \frac{1200}{120} - 5 = 5$ ohms at 0 time The average tube resistance $R_{t(\text{ave.})}$ between 0 and $t$ time $=$ $$\frac{\left(\frac{10^6 t}{33} - 5\right) + 5}{2} = \frac{10^6 t}{66}$$

Figure 5:
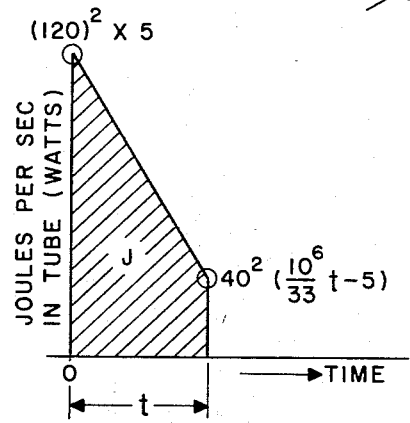
FIG. 5 illustrates the instantaneous power developed in tube.
Figure 8:
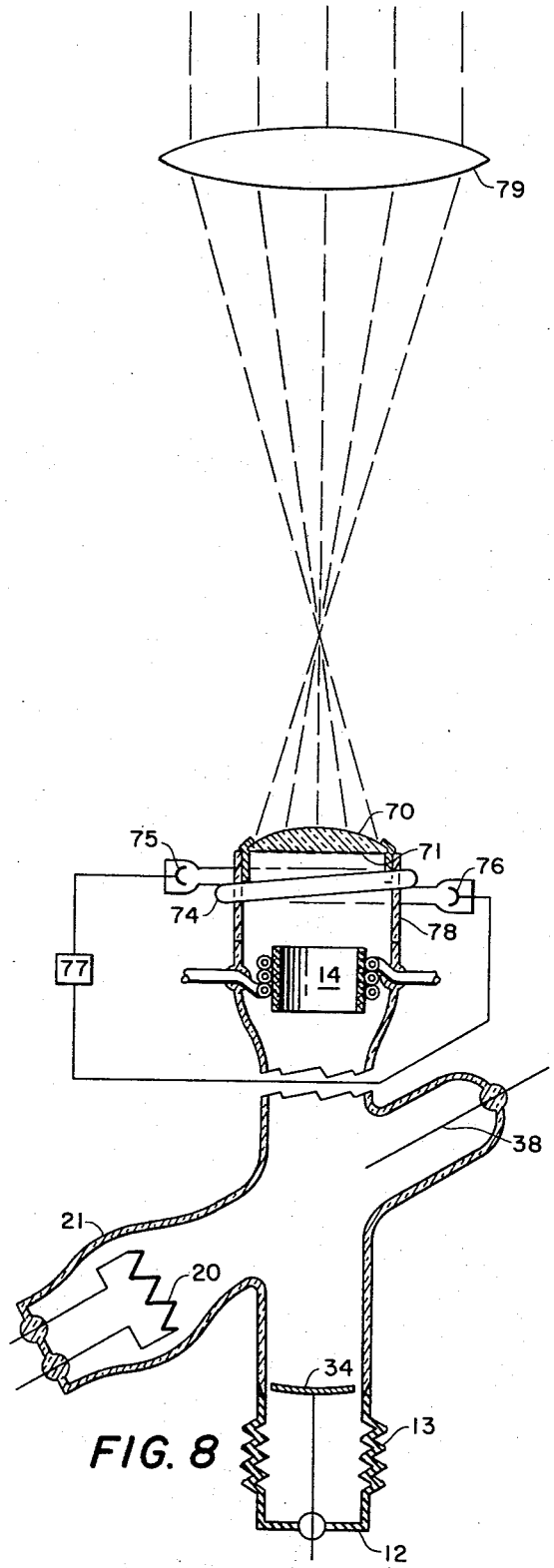

The total joules spent in the tube in $t$ time is:

Because joules are proportional to the individual resistances $$\frac{\text{Joules} \times R_{t(\text{ave.})}}{R_c} = \frac{21.6}{\left(5 + \frac{10^6 t}{66}\right)} \times \frac{10^6 t}{66} \quad (M)$$

where $R_c$ is the total circuit resistance (i.e. the average tube resistance $R_{t(\text{ave.})}$ plus the 5 ohm series resistance). Also, as shown by the curve of FIG. 5, area J represents the total joules spent in the tube; from the curve this is calculated to be:

$$\frac{t\left[(120)^2 5 + (40)^2 \left(\frac{10^6 t}{33} - 5\right)\right]}{2} \quad (N)$$

By equating both of the above expressions (M) and (N) for joules spent in the tube in $t$ time:

$$\frac{21.6}{\left(5 + \frac{10^6 t}{66}\right)} \times \frac{10^6 t}{66} = \frac{t\left[(120)^2 5 + (40)^2 \left(\frac{10^6 t}{33} - 5\right)\right]}{2}$$

$$3630t + 2{,}195{,}000 t^2 = 1$$

$$t = .00024 \text{ second}$$

Introducing the value of $t$ in expression (M)

The total joules spent in the tube is:

$$\frac{21.6}{\left(5 + \frac{10^6}{66}\right)(.00024)} \times \frac{10^6}{66}(.00024) = 9.1 \text{ joules}$$

Wattage developed in the tube:

$$\text{Joules/second} = \frac{9.1}{.00024} = 37{,}800 \text{ watts}$$

The laser output watts at 1.15 microns wavelength from the present laser tube, based on prior art laser efficiency, is approximately $37{,}800 \times .015/40 = 14.2$ watts, since prior lasers with 40 watts input generate an output of .015 watt at 1.15 microns wavelength.

In a practical use, for example, if in space 14.2 watts laser signal power at 1.15 microns wavelength is leaving the laser tube for a target object (i.e. satellite or missile) at 800 kilometers distance, with a beam angle of 3 seconds of arc, the signal power S received by a detector in the target can be determined by the basic formula:

$$S = 1.81 \times 10^3 P_t \left(\frac{\lambda}{\theta^2 r}\right)^2$$

where $P_t$ is the transmitting power in watts, $\lambda$ the wavelength in microns, $\theta$ the divergence angle in seconds of in arc, and $r$ the path length in kilometers. Therefore:

$$S = 1.81 \times 10^3 \times 14.2 \left(\frac{1.15}{3^2 \times 800}\right)^2 = .00065 \text{ watt}$$

which is much more power than required for detection by existing detectors, thereby permitting use of smaller and lighter receivers in the target object.

To estimate tube length: According to Paschen's law (Thompson, Conduction of Electricity Through Gases, pp. 371, 487, Cambridge University Press, 1933), the minimum sparking potential for helium is 196 volts for $27pd$; where $p$ is in millimeters of Hg pressure and $d$ is the distance between electrodes in millimeters. Since in the present example the chosen peak voltage is 1200 volts, to find the length of the tube necessary for this voltage at 1 millimeter pressure:

$$1200 = 196 \left[\frac{\frac{d \times 1}{27}}{1 + \log_e \frac{d}{27}}\right]$$

$$\frac{d}{27} = 26$$

then $d = 702$ millimeters

This length can be increased about 10 to 15% in the present invention because a hot cathode is used which has lower cathode drop. Therefore it would be permissible to use an 800 millimeter length of tube, for instance. Tube diameter will depend upon the electron temperature in the tube, desired tube life and the laser beam intensity desired. However, diameters ranging from 12 to 25 millimeters are suitable.

The laser tube, as has been described, does not require heavy fastening carriers since it is a large diameter tube. Also, the operating temperature of the discharge column per watt of laser output is lower thereby eliminating the erratic effects present in CW operated tubes. The geometric cross-section and optics of the present device at the anode end has new features which eliminates non-axial modes resulting in narrow line width. The technique for opening and concentrating the laser beam is novel, and the present device, due to the large diameter of the tube and mirrors, also is inherently capable of producing high Q cavity resonances which make it more efficient. Further, because of the large tube diameter the Helium metastable atoms generated near the anode can diffuse axially along the discharge path and the neon 1S state empties to the wall to ground state easily thus increasing efficiency.

Other designs of laser tubes based on the present invention are shown in FIGS. 6–10 where components similar to those described in FIG. 1 have the same reference numerals.

Figure 6:
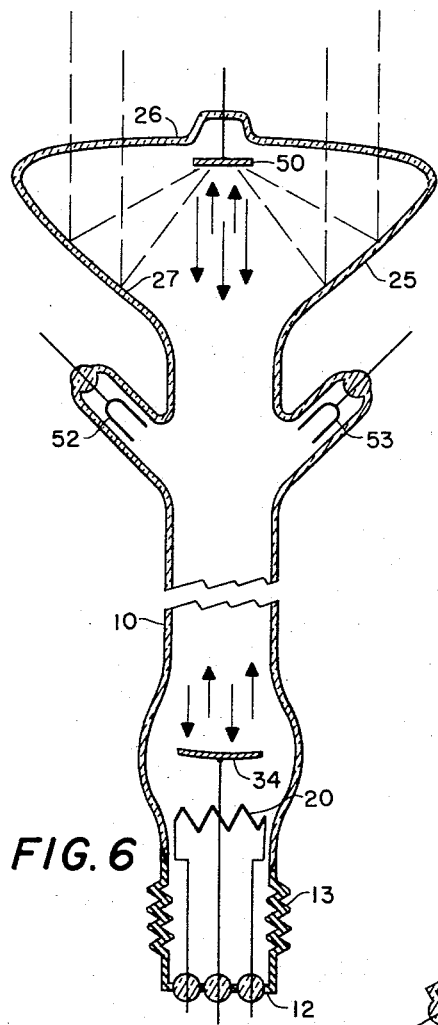
FIGS. 6 through 10 show examples of other embodiments of gaseous lasers of the present invention.

In the tube illustrated in FIG. 6 the reflector 50 is coated with a high reflection factor and high melting point ceramic material (e.g. calcium carbonate, calcium tungstate, zinc sulfate, etc.) of proper particle size and distribution to scatter a small percentage of impinging radiation from mirror 34 in a predetermined solid angle to cover the parabolic like reflector surface 27. The small percentage (2 to 5%) of the light from the resonating cavity which impinges on reflective surface 50 is scattered according to a sharp cosine law reflection curve and the remaining light (95 to 98%) continues to resonate between reflective surfaces 50 and 34 to keep the laser effect going in the tube. The radiation which impinges on surface 27 is then reflected through transparent end 26 in a parallel fashion. In this embodiment, anodes 52 and 53 are positioned adjacent the main tube column such as illustrated. With this double anode arrangement firing condensers, 180° out-of-phase, can be used from two separate firing circuits (like that of FIG. 2).

As shown in FIGS. 7–10, the end mirrors 34, 50, etc. are not in the ionized gas section of the tubes and, consequently, being outside the high temperature of the discharge area a wide variety of reflectors and materials can be used for giving narrow line widths. With the present system for generating high laser outputs, the tube diameter does not have to be small as is necessary in prior type existing devices. Since the present laser tubes are larger, they are more sturdy and not affected by vibrations which cause broad line widths.

The present laser tube system can be used as an antenna for sending a laser beam to a target and for receiving reflected weak radiation from the target. The tube illustrated in FIG. 7 has its transparent end formed from concentric Brewster angle lenses 60, made of high transmission factor material, for good reception of return radiation reflected from a target following a laser shot. Return radiation passes through Brewster angle lenses 60, is reflected from surface 27 to impinge on distributing mirror 50 and is reflected down the positive or discharge column where it is reflected back and forth between mirrors 34 and 50. When used as a sending and receiving device, this tube has its side walls shielded so that no extraneous outside light can reach the inside of the tube. At this stage there is no after-glow metastables remaining from the previous laser shot and the voltage on regulator wire 38 is adjusted to a value just below that necessary for condition to begin ionization between it and cathode 20. Around regulator wire (anode) 38 is positioned a grid 62 having photoemissive spots thereon. The return or incoming radiation from a target with its excitation value at its laser wavelength plus the minute quantity of electrons generated by this radiation on the photoemissive spots on grid 62 is just sufficient to bring the space between cathode 20 and wire 38 up to the condition necessary to start a weak conduction shot between cathode 20 and wire 38. Using any suitable amplification means this weak conduction can be amplified; this now provides a complete receiver for detecting the response from a target. The action between cathode 20 and wire 38 can be considered a type of thyratron effect with the reflected radiation being used to cause the firing therebetween.

Figure 9:
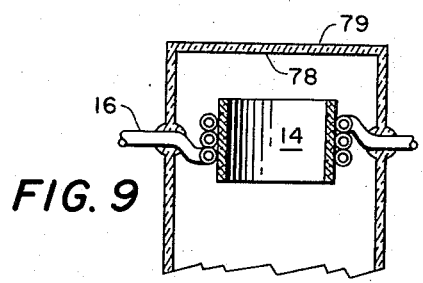

The present invention provides two ways for modulating the laser output. Referring to FIG. 1 for one illustration, the laser output can be modulated by axially vibrating the semispherical scatter reflector 29 with vibrating means 36, which may be by magnetostrictive, piezoelectric effect etc. When reflector 29 is vibrated the outgoing laser beam opens and closes thus modulating the power impinging on a target. Now referring to FIG. 8, where a parabolic surface 27 is not used, a lens 70 is provided as the tube end closure and has its lower surface 71 designed as a flat partial mirror to act along with mirror 34 as resonator in the tube cavity. A gaseous discharge tube 74 having electrodes 75 and 76 is coiled around the outside of the laser tube. Discharge tube 74 is made of ultraviolet transmitting material and generates ultraviolet light. Partial mirror 71 is made of a highly reflective ceramic material (e.g. calcium tungstate or the like) that changes its color and reflecting power when ultraviolet radiation impinges thereon. Ultraviolet rays in pulse or continuous wave form from tube 74 impinge on partially mirrored surface 71 thereby varying the reflection factor of surface 71 and thus can modulate the outgoing beam. The main tube 78 is necessarily made of ultraviolet transmitting material in this area. The outgoing laser beam is collimated by additional lens means 79. A magnetic amplifier or other means 77 for applying a modulating signal across ultraviolet generator 74 can thus be provided for modulating the laser output. The laser tube of FIGS. 1 and 7 can be provided with a flat end 79, as shown in FIG. 9 near the anode 14, with a partial reflector coating thereon, like coatings 32 and 71 of FIGS. 1 and 7.

Figure 7:
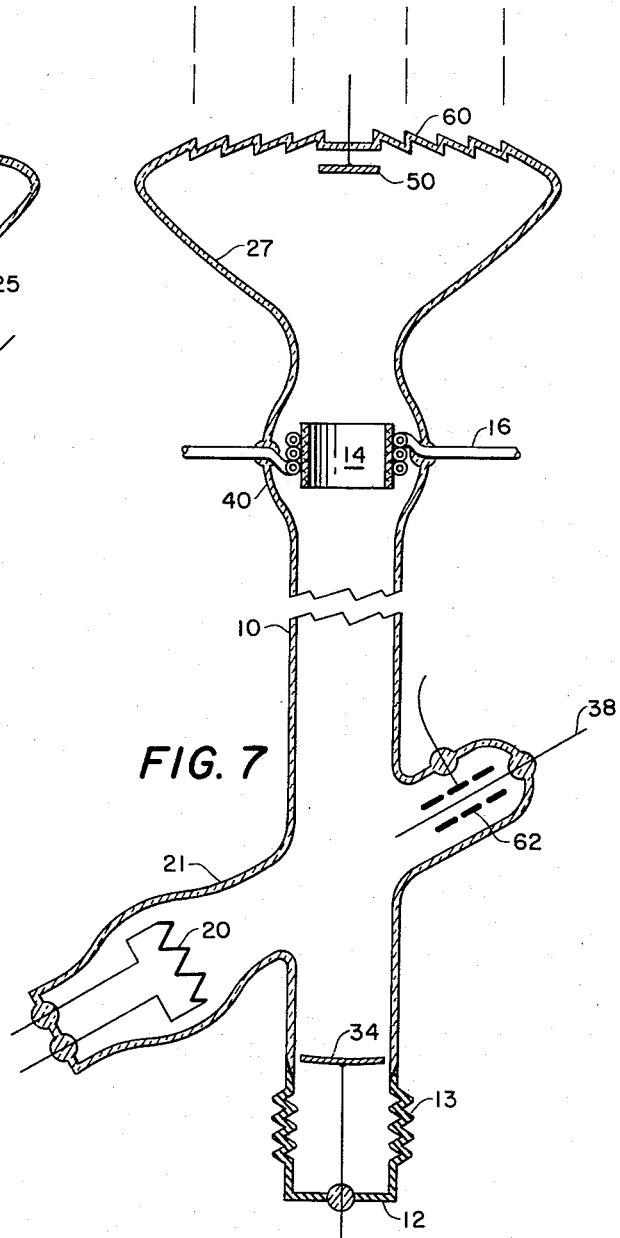

The shape of the tube near the anode, FIGS. 1 and 7, and the cylindrical anode have mode selection effects by reducing internal reflection and eliminating the non-axial rays. In excitation, most of the metastables are generated near the anode and then diffused down the tube.

The energization of the tube and the pumping action is caused by D.C. high current pulses from a charged condenser in a ringing circuit such as that of FIG. 2, for example. The striking time, striking voltage, on time, off time and output current waveshape are all regulated instantaneously by the simple ringing circuit and by the tube characteristics, FIG. 3; the tube application determines these constants.

Figure 10:
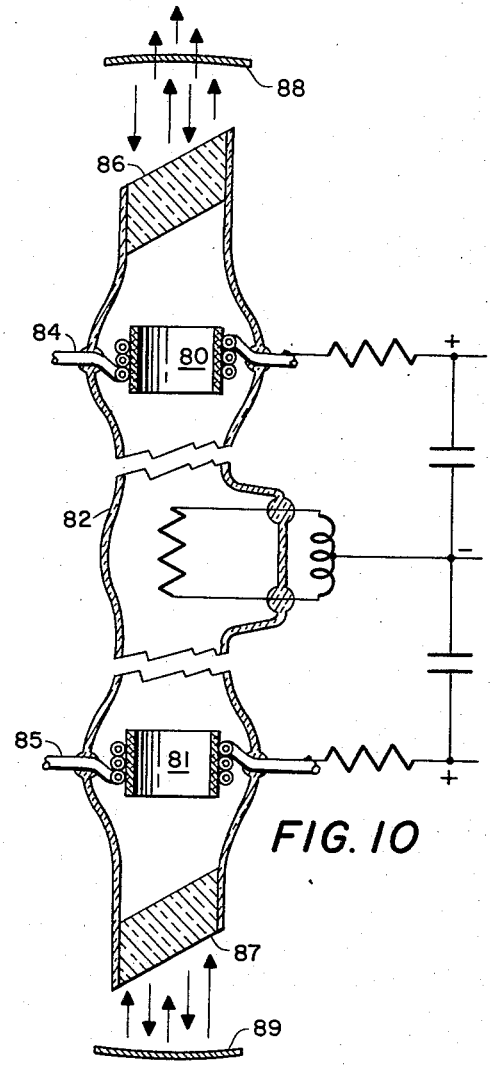

A double anode tube is illustrated in FIG. 10 wherein anodes 80 and 81 which are similar to anode 14 of FIG. 1 are at opposite ends of tube 82 permitting double-anode effect as in FIG. 5. Coils 84 and 85, similar to coil 16 of FIG. 1, are metallic tubes for cooling and making contact with the anodes. Tube ends 86 and 87, of quartz or the like, are set at a Brewster angle to transmit the coherent laser beam outside the tube to mirrors 88 and 89. Mirror 88 is a partial mirror allowing the laser beam to pass through whereas mirror 89 is completely reflective. This design allows the use of a shorter tube between the cathode and anode, permitting the use of smaller power supplies and lower voltage.

In general the gaseous laser devices of the present invention operate in the following manner:

A mixture of an appropriate number of particles of two gases (one or more gases can also be used) in a sealed enclosure are excited by condenser discharge or explosion at a suitable voltage to produce "ringing effect" of the power supply. Electrical energy through electron vibration transfers selectively by metastable states of one gas in the mixture to appropriate upper level of excitation or vibration (i.e. energy state) of the second gas by collision. This upper level of the second gas by radiation stimulates a lower level of the second gas causing this lower level to vibrate at its own frequency. The jump from the frequency of the upper level to the frequency of the lower level generates a desired laser output frequency which forms many mode of vibrations in the enclosure. The strongest modes of vibration are along the path between the reflecting cavity resonating means and are helped by the cooling means about the anode where the majority of the metastables of the first gas are formed. These strongest modes of vibration are selected by the position and effect of the two cavity forming reflectors in line with the anode-cathode direction. The shape of the enclosure in the critical anode area helps to filter out unwanted modes of vibration as does the output optical system adjacent to the anode. These strong modes are intensified by the resonating effect of the reflecting means (e.g. mirrors, etc.) which also amplifies the primary "pumping" discharge. The outgoing portion of the generated laser radiation is reflected from a small internal reflecting means in accordance with a sharp cosine law of distribution to a parabolic reflective surface adjacent to the anode end which in turn reflects this portion of the laser radiation outward in a parallel beam. The overall action of the above system at all times keeps a greater number of second gas atoms in the higher state than in the lower state.

Obviously many modifications and variations of the present invention are possible in the light of the above teachings. It is therefore to be understood that within the scope of the appended claims the invention may be practiced otherwise than as specifically described.

What is claimed is:

1. A gaseous laser device comprising:
   (a) an elongated tubular enclosure of heat resisting glass-like material,
   (b) a high-current-carrying electron-emitting cathode mounted near one end of said tubular enclosure,
   (c) anode means mounted near the opposite end of said tubular enclosure,
   (d) a closure means for sealing the cathode end of said tubular enclosure,
   (e) a radiation reflecting mirror mounted at the cathode end of said enclosure outside the discharge path between said anode and cathode,
   (f) the opposite end of said enclosure, beyond said anode, being the beam output end of the laser enclosure,
   (g) a closure for sealing said beam output end made of material which will transmit the desired laser frequency,
   (h) an inert gas mixture contained within said enclosure,
   (i) means mounted at the beam output end of said laser enclosure which reflects a large percentage of the laser radiation impinging thereon and allows the remaining small percentage of the laser radiation to be transmitted out through said beam output end in a parallel beam,
   (j) said anode means allowing laser radiation reflected from the mirror at the cathode end to pass directly to said reflecting means at the beam output end,
   (k) means for causing pulsed high current discharge between said anode and said cathode resulting in high laser radiation which resonates in the resonating cavity formed between said cathode end reflecting mirror and the reflecting means at said beam output end,
   (l) a circumferential bulge about said tubular enclosure in the vicinity of said anode for eliminating any non-axial modes of radiation.

2. A laser device as in claim 1 wherein the cathode end closure is provided with adjustable bellow means for minute adjustment of the resonating cavity length.

3. A laser device as in claim 1 wherein said anode is in the shape of an open ended cylinder allowing laser radiation to pass therethrough, and has a diameter substantially the same as the internal diameter of said tubular enclosure.

4. A gaseous laser device comprising:
   (a) an elongated tubular enclosure of heat resisting glass-like material,
   (b) a high-current-carrying electron-emitting cathode mounted near one end of said tubular enclosure,
   (c) anode means mounted near the opposite end of said tubular enclosure,
   (d) a closure means for sealing the cathode end of said tubular enclosure,
   (e) a radiation reflecting mirror mounted at the cathode end of said enclosure outside the discharge path between said anode and cathode,
   (f) the opposite end of said enclosure, beyond said anode, being the beam output end of the laser enclosure,
   (g) a closure for sealing said beam output end made of material which will transmit the desired laser frequency,
   (h) an inert gas mixture contained within said enclosure,
   (i) means mounted proximate to the beam output end of said laser enclosure which reflects back a large percentage of the laser radiation impinging thereon and allows the remaining small percentage of the laser radiation to be transmitted therethrough to a radiation beam output directing means,
   (j) said anode means allowing laser radiation reflected from the mirror at the cathode end to pass directly to said reflecting means at the beam output end,
   (k) means for causing pulsed high current discharge between said anode and said cathode resulting in high laser radiation which resonates in the resonating cavity formed between said cathode and reflecting mirror and the reflecting means at said beam output end,
   (l) the walls of said enclosure, at the beam output end beyond the anode, being enlarged and surfaced to form a somewhat parabolic shaped reflector surface for reflecting said very small percentage of laser radiation transmitted through said output end mounted means via said radiation beam output directing means out through said end closure in a parallel beam.

5. A gaseous laser device comprising:
   (a) an elongated tubular enclosure of heat resisting glass-like material,
   (b) a high-current-carrying electron-emitting cathode mounted near one end of said tubular enclosure,
   (c) anode means mounted near the opposite end of said tubular enclosure,
   (d) a closure means for sealing the cathode end of said tubular enclosure,
   (e) a radiation reflecting mirror mounted at the cathode end of said enclosure outside the discharge path between said anode and cathode,
   (f) the opposite end of said enclosure, beyond said anode, being the beam output end of the laser enclosure,
   (g) a closure for sealing said beam output end made of material which will transmit the desired laser frequency, (h) an inert gas mixture contained within said enclosure,
(i) means mounted proximate to the beam output end of said laser enclosure which reflects back a large percentage of the laser radiation impinging thereon and allows the remaining small percentage of the laser radiation to be transmitted therethrough to a radiation beam output directing means,
(j) said anode means allowing laser radiation reflected from the mirror at the cathode end to pass directly to said reflecting means at the beam output end,
(k) means for causing pulsed high current discharge between said anode and said cathode resulting in high laser radiation which resonates in the resonating cavity formed between said cathode end reflecting mirror and the reflecting means at said beam output end,
(l) the walls of said enclosure, at the beam output end beyond the anode, being enlarged and surfaced to form a somewhat parabolic shaped reflector surface for reflecting said very small percentage of laser radiation transmitted through said output end mounted means via said radiation beam output directing means out through said end closure in a parallel beam,
(m) vibration means provided at said beam output end upon which said output end mounted means is mounted for vibrating same in an axial direction to said elongated tube enclosing thereby modulating the outgoing beam formed from said very small percentage of laser radiation by opening and concentrating the beam.

6. A gaseous laser device comprising:
(a) an elongated tubular enclosure of heat resisting glass-like material,
(b) a high-current-carrying electron-emitting cathode mounted near one end of said tubular enclosure,
(c) anode means mounted near the opposite end of said tubular enclosure,
(d) a closure means for sealing the cathode end of said tubular enclosure,
(e) a radiation reflecting mirror mounted at the cathode end of said enclosure outside the discharge path between said anode and cathode,
(f) the opposite end of said enclosure, beyond said anode, being the beam output end of the laser enclosure,
(g) a closure for sealing said beam output end made of material which will transmit the desired laser frequency,
(h) an inert gas mixture contained within said enclosure,
(i) means mounted on the inner surface of said output end closure which reflects a very large percentage of the laser radiation impinging thereon and allows the remaining very small percentage of the laser radiation to pass through and be transmitted through said beam output end in a parallel beam,
(j) said anode means allowing laser radiation reflected from the mirror at the cathode end to pass directly to said reflecting means at the beam output end,
(k) means for causing pulsed high current discharge between said anode and said cathode resulting in high laser radiation which resonates in the resonating cavity formed between said cathode end reflecting mirror and the reflecting means at said beam output end,
(l) the wall of said tubular enclosure in the area between said anode and said output end closure being made from ultraviolet transmitting material,
(m) an ultraviolet radiation generating means about said tubular enclosure adjacent said wall area of ultraviolet transmitting material,
(n) said means on the inner surface of said output end closure being a partial coating of highly reflective ceramic material that changes its color and reflecting power when ultraviolet radiation impinges thereon whereby varying the ultraviolet radiation from said ultraviolet generating means impinging on said partial coating can vary the reflective factor thereof and thus modulate the outgoing laser beam.

7. A laser device as in claim 6 wherein said output end closure comprises optical lens means.

8. A gaseous laser device comprising:
(a) an elongated tubular enclosure of heat resisting glass-like material,
(b) a high-current-carrying electron-emitting cathode mounted near one end of said tubular enclosure,
(c) anode means mounted near the opposite end of said tubular enclosure,
(d) a closure means for sealing the cathode end of said tubular enclosure,
(e) a radiation reflecting mirror mounted at the cathode end of said enclosure outside the discharge path between said anode and cathode,
(f) the opposite end of said enclosure, beyond said anode, being the beam output end of the laser enclosure,
(g) a closure for sealing said beam output end made of material which will transmit the desired laser frequency,
(h) an inert gas mixture contained within said enclosure,
(i) means mounted at the beam output end of said laser enclosure which reflects a large percentage of the laser radiation impinging thereon and allows the remaining small percentage of the laser radiation to be transmitted out through said beam output end in a parallel beam,
(j) said anode means allowing laser radiation reflected from the mirror at the cathode end to pass directly to said reflecting means at the beam output end,
(k) means for causing pulsed high current discharge between said anode and said cathode resulting in high laser radiation which resonates in the resonating cavity formed between said cathode end reflecting mirror and the reflecting means at said beam output end,
(l) as grid means mounted in the wall of said enclosure opposite said cathode at the cathode end of the enclosure for providing a type of thyratron effect between said grid and cathode and thus providing a means for regulating the striking voltage and striking time for the laser device.

9. A gaseous laser device comprising:
(a) an elongated tubular enclosure of heat resisting glass-like material,
(b) a high-current-carrying electron-emitting cathode mounted near one end of said tubular enclosure,
(c) anode means mounted near the opposite end of said tubular enclosure,
(d) a closure means for sealing the cathode end of said tubular enclosure,
(e) a radiation reflecting mirror mounted at the cathode end of said enclosure outside the discharge path between said anode and cathode,
(f) the opposite end of said enclosure, beyond said anode, being the beam output end of the laser enclosure,
(g) a closure for sealing said beam output end made of material which will transmit the desired laser frequency,
(h) an inert gas mixture contained within said enclosure,
(i) means mounted at the beam output end of said laser enclosure which reflects a large percentage of the laser radiation impinging thereon and allows the remaining small percentage of the laser radiation to be transmitted out through said beam output end in a parallel beam, (j) said anode means allowing laser radiation reflected from the mirror at the cathode end to pass directly to said reflecting means at the beam output end, (k) means for causing pulsed high current discharge between said anode and said cathode resulting in high laser radiation which resonates in the resonating cavity formed between said cathode end reflecting mirror and the reflecting means at said beam output end, (l) a grid means mounted in the wall of said enclosure opposite said cathode at the cathode end of the enclosure for providing a type of thyratron effect between said grid and cathode and thus providing a means for regulating the striking voltage and striking time for the laser device, (m) said output end closure being in the form of concentric Brewster angle lenses for good reception of return reflected radiation following a laser shot, (n) said grid means being surrounded with photoemissive spots wherein when the voltage between said grid means and cathode is adjusted to be just below that necessary for condition to begin ionization therebetween and return radiation received by the laser device following a laser shot with its excitation value plus the minute quantity of electrons generated by the return radiation impinging on said photoemissive spots is just sufficient to bring the space between said grid and cathode up to condition necessary to start a weak conduction the laser device can also be used as a receiver for detecting return reflected laser signals.

10. A gaseous laser device comprising:
(a) an elongated tubular enclosure having a diameter selected from the range of 12 to 25 millimeters and made from heat resisting glass-like material,
(b) a high-current-carrying electron-emitting cathode mounted near one end of said tubular enclosure,
(c) anode means mounted near the opposite end of said tubular enclosure,
(d) a closure means for sealing the cathode end of said tubular enclosure,
(e) a radiation reflecting mirror mounted at the cathode end of said enclosure outside the discharge path between said anode and cathode,
(f) the opposite end of said enclosure, beyond said anode, being the beam output end of the laser enclosure,
(g) a closure for sealing said beam output end made of material which will transmit the desired laser frequency,
(h) an inert gas mixture contained within said enclosure,
(i) semi-reflecting means mounted at the beam ouput end of said laser enclosure which reflects back a large percentage of the laser radiation impinging thereon and allows the remaining small percentage of the laser radiation to be transmitted out through said beam output end in a parallel beam,
(j) said anode means allowing laser radiation reflected from the mirror at the cathode end to pass directly to said reflecting means at the beam output end,
(k) means for causing pulsed high current discharge between said anode and said cathode resulting in high laser radiation which resonates in the resonating cavity formed between said cathode end reflecting mirror and the reflecting means at said beam output end,
(l) a circumferential bulge about said tubular enclosure in the vicinity of said anode for eliminating any non-axial modes of radiation.

11. A gaseous laser device comprising:
(a) an elongated tubular enclosure of heat resisting glass-like material,
(b) a high-current-carrying electron-emitting cathode mounted near one end of said tubular enclosure,
(c) anode means mounted near the opposite end of said tubular enclosure,
(d) a closure means for sealing the cathode end of said tubular enclosure,
(e) a radiation reflecting mirror mounted at the cathode end of said enclosure outside the discharge path between said anode and cathode,
(f) the opposite end of said enclosure, beyond said anode, being the beam output end of the laser enclosure,
(g) a closure for sealing said beam output end made of material which will transmit the desired laser frequency,
(h) an inert gas mixture contained within said enclosure,
(i) semi-reflecting means mounted at the beam output end of said laser enclosure which reflects a large percentage of the laser radiation impinging thereon and allows the remaining small percentage of the laser radiation to be transmitted therethrough,
(j) the walls of said enclosure, at the beam output end beyond the anode and reflective means, being enlarged and surfaced to form a somewhat parabolic shaped reflector surface,
(k) radiation beam output directing means mounted between said end enclosure and said semi-reflective means for reflecting and scattering in a solid angle to said parabolic shaped reflector surface and out through the end closure in a parallel beam the very small percentage of laser radiation which is permitted to pass through said reflective means,
(l) said anode means allowing laser radiation reflected from the mirror at the cathode end to pass directly to said reflecting means at the beam output end,
(m) means for causing pulsed high current discharge between said anode and said cathode resulting in high laser radiation which resonates in the resonating cavity formed between said cathode end reflecting mirror and the reflecting means at said beam output end.

12. A gaseous laser device comprising:
(a) an elongated tubular enclosure of heat resisting glass-like material,
(b) a high-current-carrying electron-emitting cathode mounted near one end of said tubular enclosure,
(c) anode means mounted near the opposite end of said tubular enclosure,
(d) a closure means for sealing the cathode end of said tubular enclosure,
(e) a radiation reflecting mirror mounted at the cathode end of said enclosure outside the discharge path between said anode and cathode,
(f) the opposite end of said enclosure, beyond said anode, being the beam output end of the laser enclosure,
(g) a closure for sealing said beam output end made of material which will transmit the desired laser frequency,
(h) an inert gas mixture contained within said enclosure,
(i) means mounted at the beam output end of said laser enclosure which reflects a large percentage of the laser radiation impinging thereon and allows the remaining small percentage of the laser radiation to be transmitted out through said beam output end in a parallel beam,
(j) the walls of said enclosure, at the beam output end beyond the anode and reflective means, being enlarged and surfaced to form a somewhat parabolic shaped reflector surface,
(k) scattering means mounted between said end enclosure and said reflective means for reflecting and scattering in a solid angle to said parabolic shaped reflector surface and out through the end enclosure in a parallel beam the very small percentage of laser radiation which is permitted to pass through said reflective means, (l) said anode means allowing laser radiation reflected from the mirror at the cathode end to pass directly to said reflecting means at the beam output end, (m) means for causing pulsed high current discharge between said anode and said cathode resulting in high laser radiation which resonates in the resonating cavity formed between said cathode end reflecting mirror and the reflecting means at said beam output end, (n) vibration means provided at said beam output end upon which said scattering means is mounted for vibrating same in an axial direction to said elongated tube enclosure thereby modulating the outgoing beam formed from said very small percentage of laser radiation by opening and concentrating the beam.

13. A gaseous laser device comprising:
(a) an elongated tubular enclosure of heat resisting glass-like material,
(b) a high-current-carrying electron-emitting cathode mounted near one end of said tubular enclosure,
(c) anode means mounted near the opposite end of said tubular enclosure,
(d) a closure means for sealing the cathode end of said tubular enclosure,
(e) a radiation reflecting mirror mounted at the cathode end of said enclosure outside the discharge path between said anode and cathode,
(f) the opposite end of said enclosure, beyond said anode, being the beam output end of the laser enclosure,
(g) a closure for sealing said beam output end made of material which will transmit the desired laser frequency,
(h) an inert gas mixture contained within said enclosure,
(i) means mounted at the beam output end of said laser enclosure which reflects a large percentage of the laser radiation impinging thereon and allows the remaining small percentage of the laser radiation to be transmitted out through said beam output end in a parallel beam,
(j) the walls of said enclosure, at the beam output end beyond the anode and reflective means, being enlarged and surfaced to form a somewhat parabolic shaped reflector surface,
(k) scattering means mounted between said end enclosure and said reflective means for reflecting and scattering in a solid angle to said parabolic shaped reflector surface and out through the end closure in a parallel beam the very small percentage of laser radiation which is permitted to pass through said reflective means,
(l) said anode means allowing laser radiation reflected from the mirror at the cathode end to pass directly to said reflecting means at the beam output end,
(m) an ultraviolet radiation generating means about said tubular enclosure adjacent said wall area of ultraviolet transmitting material,
(n) the wall of said tubular enclosure in the area between said anode and said reflective means near the beam output end being made from ultraviolet transmitting material,
(o) vibration means provided at said beam output end upon which said output end mounted means is mounted for vibrating same in an axial direction to said elongated tube enclosure thereby modulating the outgoing beam formed from said very small percentage of laser radiation by opening and concentrating the beam, (p) the reflective surface of the reflective means mounted near the beam output end being a partial coating of highly reflective ceramic material that changes its color and reflecting power when ultraviolet radiation impinges thereon whereby varying the ultraviolet radiation from said ultraviolet generating means impinging on said partial coating can vary the reflective factor thereof and thus modulate the outgoing laser beam.

14. A dual-anode gaseous laser device comprising:
(a) an elongated tubular enclosure of heat resisting glass-like material,
(b) a high-current-carrying electron-emitting cathode mounted mid-way along the length of said tubular enclosure,
(c) anode means mounted near opposite ends of said tubular enclosure,
(d) closure means at each end of said tube for sealing same made of material which will transmit the desired laser frequency,
(e) an inert gas mixture contained within said enclosure,
(f) a radiation reflecting mirror mounted near one of said end closure means and outside said tubular enclosure for reflecting laser radiation transmitted out through said one end closure back into the laser device in a parallel beam along the tubular axis of said enclosure,
(g) semi-reflective means mounted near said other end closure and outside said tubular closure for reflecting back into the laser device in a parallel beam along said tubular axis a large percentage of the laser radiation transmitted out through said other end closure and impinging thereon and allowing the remaining small percentage of laser radiation to be transmitted therethrough in a parallel beam as the laser output,
(h) each of said anode means allowing laser radiation to be reflected and to resonate in the resonating cavity formed between the reflecting mirror at one end and the reflective means at the other end of said laser device,
(i) means for causing pulsed high current discharge between said cathode and each of said anodes resulting in high laser radiation which resonates in the resonating cavity,
(j) a circumferential bulge about said tubular enclosure in the vicinity of said anode for eliminating any non-axial modes of radiation.

15. A device as in claim 14 wherein a cooling coil is provided about each of said anodes for providing support, cooling and electrical contact thereto, the ends of said cooling coils passing through the wall of said enclosure.

16. A device as in claim 14 wherein said end closures are Brewster angle lenses.

17. A laser device as in claim 1 wherein a tubular cooling coil is provided about said anode for providing support, cooling and electrical contact to the anode.

18. A laser device as in claim 4 wherein said radiation beam output directing means comprises a curved ceramic surface having a high coefficient of diffused reflection for the desired laser frequency.

References Cited

UNITED STATES PATENTS 3,164,782    1/1965    Ordway _____ 331—94.5
3,252,110    5/1966    Gustafson et al. _____ 331—94.5

(Other references on following page)

FOREIGN PATENTS 608,711  3/1962  Belgium.

OTHER REFERENCES

Arecchi et al.: HE-NE Optical Masers: Construction and Measurements, Alta Frequenza, vol. 31, No. 11 (November 1962), pp. 718–721.

Haisma et al.: A Small Stable Gas Laser, Philips Technical Review, vol. 24, No. 3 (Feb. 4, 1962), pp. 95–97.

JEWELL H. PEDERSEN, *Primary Examiner.*

W. L. SIKES, *Assistant Examiner.*